(12) United States Patent
Tokunaga et al.

(10) Patent No.: US 11,914,444 B2
(45) Date of Patent: Feb. 27, 2024

(54) MANAGING ACTIVATION TIME OF SLAVE ECUS IN SLEEP STATE WITH A MANAGEMENT TABLE WHEN IGNITION IS TURNED OFF

(71) Applicant: HONDA MOTOR CO., LTD., Tokyo (JP)

(72) Inventors: Tomoya Tokunaga, Tokyo (JP); Yusuke Yoshimura, Tokyo (JP); Satoshi Kono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 17/679,134

(22) Filed: Feb. 24, 2022

(65) Prior Publication Data
US 2022/0317753 A1    Oct. 6, 2022

(30) Foreign Application Priority Data

Mar. 30, 2021   (JP) ................ 2021-058451

(51) Int. Cl.
| | |
|---|---|
| G06F 1/32 | (2019.01) |
| G06F 1/3206 | (2019.01) |
| H04L 12/40 | (2006.01) |
| H04W 4/48 | (2018.01) |

(52) U.S. Cl.
CPC ...... *G06F 1/3206* (2013.01); *H04L 12/40039* (2013.01); *H04W 4/48* (2018.02); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 2009/0299561 A1* | 12/2009 | Matsumoto | B60K 6/28 903/903 |
| 2012/0239246 A1* | 9/2012 | Tanaka | H04L 12/40091 701/33.4 |
| 2013/0159577 A1* | 6/2013 | Fujii | G06F 13/24 710/262 |
| 2015/0291005 A1* | 10/2015 | Olaleye | B60H 1/00428 702/183 |
| 2016/0070582 A1* | 3/2016 | Clovis | G06F 13/4208 710/104 |

(Continued)

FOREIGN PATENT DOCUMENTS

JP    2012171361 A    9/2012

*Primary Examiner* — Danny Chan

(57) ABSTRACT

An in-vehicle electronic system comprises a core ECU (Electronic Control Unit) mounted in a vehicle and a plurality of slave ECUs that is capable of communicating with the core ECU through an in-vehicle communication network, wherein the core ECU is configured to manage a current time while a main power source of the vehicle is in an off state and manage an activation time of each of the plurality of slave ECUs in a sleep state with a management table while the main power source is in an off state, wherein the core ECU is configured to send an activation signal to each slave ECU through the in-vehicle communication network when the current time becomes the activation time of each of the plurality of slave ECUs while the main power source is in an off state.

15 Claims, 5 Drawing Sheets

(56) References Cited

U.S. PATENT DOCUMENTS

| | | | |
|---|---|---|---|
| 2018/0295011 A1* | 10/2018 | Wang | H04L 41/0833 |
| 2020/0312051 A1* | 10/2020 | Nishikawa | B60R 25/241 |
| 2021/0258186 A1* | 8/2021 | Tokunaga | H04L 12/40039 |

* cited by examiner

| ECU ID | INDIVIDUAL ACTIVATION RECOGNITION FUNCTION | COMMUNI- CATION NETWORK ID | ACTIVATION TIME 1 | | ACTIVATION TIME 2 | | ... |
|---|---|---|---|---|---|---|---|
| | | | ACTIVATION TIME | PERMITTED TIME | ACTIVATION TIME | PERMITTED TIME | ... |
| 1 | 1 | 1 | 5h | ±1h | - | - | ... |
| 2 | 1 | 2 | 5min | ±0min | EVERY 6 DAYS | ±1d | ... |
| 3 | 1 | 2 | EVERY 6 DAYS | ±1d | - | - | ... |
| 4 | 1 | 2 | 2:00 | - | - | - | ... |
| 5 | 1 | 3 | 6h | ±1h | - | - | ... |
| 6 | 0 | 4 | 5h | ±1h | - | - | ... |
| 7 | 0 | 4 | 6h | ±1h | - | - | ... |
| 8 | 0 | 4 | 4h | ±1h | - | - | ... |
| 9 | 0 | 5 | EVERY 2 HOURS | ±1h | - | - | ... |
| 10 | 0 | 5 | EVERY 3 HOURS | ±1h | - | - | ... |
| 11 | 0 | 5 | EVERY 6 HOURS | ±1h | - | - | ... |

*FIG.2*

| ECU ID | NW ID | ACTIVATION TIME |
|---|---|---|
| 1, 5 | - | +5h |
| 2 | - | EVERY +5 MINUTES |
| 2, 3 | - | EVERY +6 DAYS |
| 4 | - | 2:00 |
| - | 4 | +5h |
| - | 5 | EVERY +3 HOURS |

*FIG.3*

MANAGING ACTIVATION TIME OF SLAVE ECUS IN SLEEP STATE WITH A MANAGEMENT TABLE WHEN IGNITION IS TURNED OFF

The contents of the following Japanese patent application(s) are incorporated herein by reference:
NO. 2021-058451 filed on Mar. 30, 2021.

BACKGROUND

1. Technical Field

The present invention relates to an in-vehicle electronic system, a vehicle, a control method, and a computer-readable storage medium.

2. Related Art

Patent document 1 describes an in-vehicle system comprising a master ECU configured to change the value of elapsed time information according to the elapse of time and repeatedly send a vehicle local time including the elapsed time information to a slave ECU when the main power source is turned off, and a slave ECU configured to receive the vehicle local time sent from the master ECU and record the latest vehicle local time in association with diagnosis information in a storage medium based on occurrence of need to record the diagnosis information.
Patent document 1: Japanese Patent Application Publication No. 2012-171361

BRIEF DESCRIPTION OF THE DRAWINGS

FIG. 2 illustrates one example of a data structure of management information managed by a management table 260.

FIG. 3 illustrates a data structure of ECU activation information generated by an ECU 202.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments necessarily have to be essential to solving means of the invention.

Figure 1:
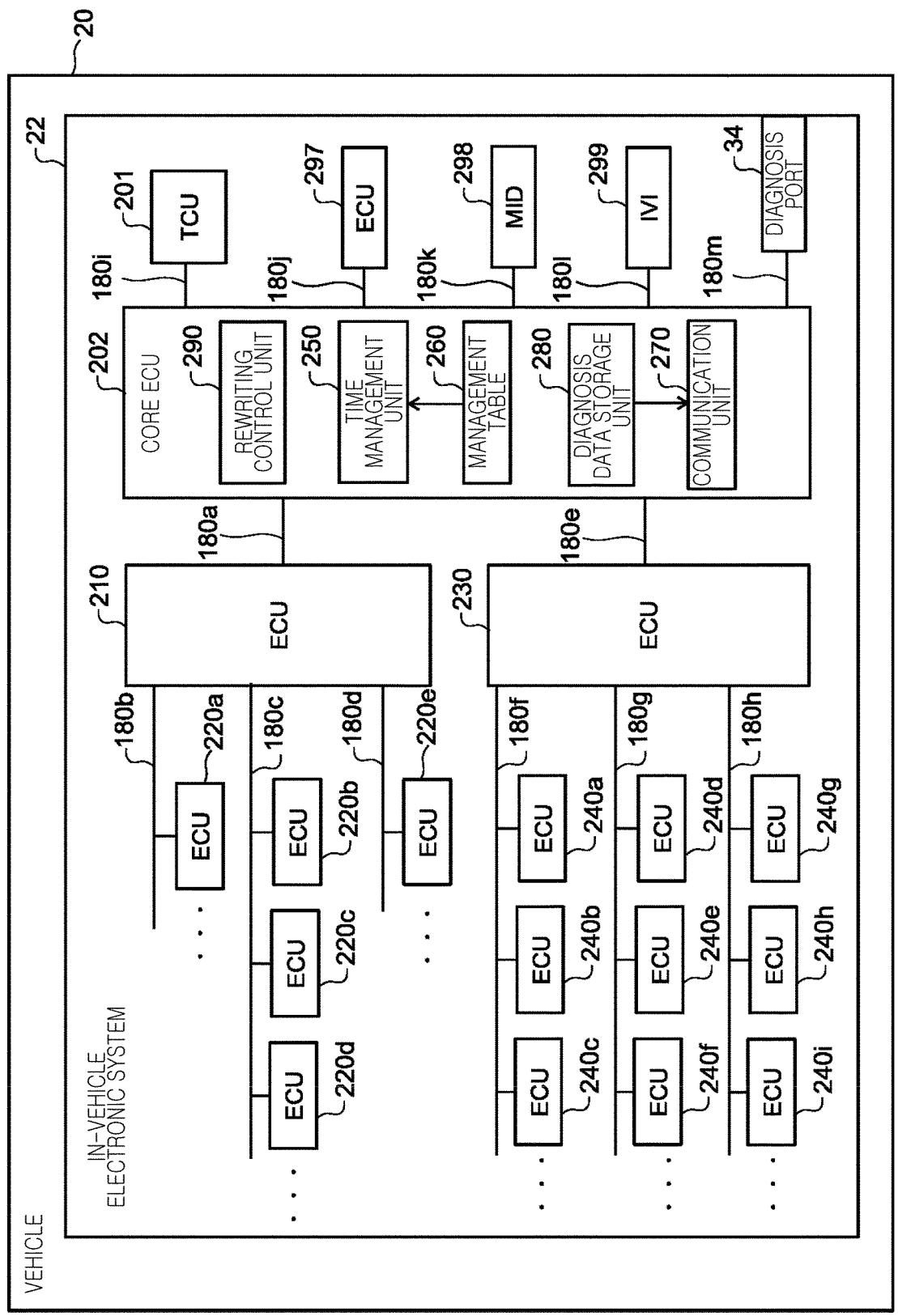
FIG. 1 schematically illustrates a system configuration of a vehicle 20 according to an embodiment.

FIG. 1 schematically illustrates a system configuration of a vehicle 20 according to an embodiment. The vehicle 20 includes an in-vehicle electronic system 22. The in-vehicle electronic system 22 includes a TCU 201, a core ECU 202, an ECU 210, ECUs 220a to 220e, an ECU 230, ECUs 240a to 240g, an ECU 297, an MID 298, and an IVI 299, as well as a diagnosis port 34. It should be noted that although a configuration in which the vehicle 20 includes the in-vehicle electronic system 22 is shown in FIG. 1, the configuration of the vehicle 20 is not limited to the example of the present embodiment.

In addition, the configuration of the in-vehicle electronic system 22 is not limited to the example of the present embodiment.

The diagnosis port 34 has an external diagnosis apparatus for retrieving diagnosis information of the vehicle 20 connected thereto. The external diagnosis apparatus is, for example, an in-vehicle fault diagnosis apparatus. The diagnosis port 34 is, for example, an OBD-II connector, and the in-vehicle fault diagnosis apparatus is, for example, a scan tool that is compliant with the OBD-II specification.

The core ECU 202, the ECU 210, the ECUs 220a to 220e, the ECU 230, the ECUs 240a to 240g, and the ECU 297 are each an electronic control unit for performing at least one of control and diagnosis of an in-vehicle device. Each ECU of the core ECU 202, the ECU 210, the ECUs 220a to 220e, the ECU 230, the ECUs 240a to 240g, and the ECU 297 may be configured to include a computer with a processor and a volatile memory and a non-volatile memory. The TCU 201 is a telematics control unit. The TCU 201 is responsible for wireless communication with the outside of the vehicle 20. For example, the TCU 201 is responsible for wireless communication through mobile network and wireless LAN communication.

The core ECU 202 is connected to the ECU 210 via a communication network 180a. The core ECU 202 and the ECU 210 are capable of mutual communication through the communication network 180a. The core ECU 202 is connected to the ECU 230 via a communication network 180e. The core ECU 202 and the ECU 230 are capable of mutual communication through the communication network 180e.

The ECU 210 is connected to a plurality of ECUs including the ECU 220a via a communication network 180b. The ECU 210 and the plurality of ECUs connected to the communication network 180b are capable of mutual communication through the communication network 180b. The ECU 210 is connected to a plurality of ECUs including the ECUs 220b to 220d via a communication network 180c. The ECU 210 and the plurality of ECUs connected to the communication network 180c are capable of mutual communication through the communication network 180c. The ECU 210 is connected to a plurality of ECUs including the ECU 220e via a communication network 180d. The ECU 210 and the plurality of ECUs connected to the communication network 180d are capable of mutual communication through the communication network 180d.

The ECU 230 is connected to a plurality of ECUs including the ECUs 240a to 240c via a communication network 180f. The ECU 230 and the plurality of ECUs connected to the communication network 180f are capable of mutual communication through the communication network 180f. The ECU 230 is connected to a plurality of ECUs including the ECUs 240d to 240f via a communication network 180g. The ECU 230 and the plurality of ECUs connected to the communication network 180g are capable of mutual communication through the communication network 180g. The ECU 230 is connected to a plurality of ECUs including the ECUs 240g to 240i via a communication network 180h. The ECU 230 and the plurality of ECUs connected to the communication network 180h are capable of mutual communication through the communication network 180h.

The core ECU 202 is connected to the TCU 201 via the communication network 180f. The core ECU 202 and the TCU 201 are capable of mutual communication through the communication network 180f. The core ECU 202 is connected to the MID 298 via the communication network 180k. The core ECU 202 and the MID 298 are capable of mutual communication through the communication network 180k.

The core ECU 202 is connected to the IVI 299 via the communication network 180*l*. The core ECU 202 and the IVI 299 are capable of mutual communication through the communication network 180*l*. The core ECU 202 is connected to the diagnosis port 34 via a communication network 180*m*.

In the present embodiment, the ECU 220*a* is an ECU for controlling a fuel injection device. The ECU 220*b* is an ECU for controlling a high-voltage battery that accumulates electric energy for running the vehicle 20. The ECU 220*c* is an ECU for controlling an electric power convertor that converts a high voltage from a high-voltage battery to a lower voltage to charge a low-voltage battery. The ECU 220*d* is an ECU for controlling a battery charger that performs charging of the high-voltage battery. The ECU 220*e* is an ECU for controlling a grille shutter. The ECU 297 is, for example, an ECU for performing control related to ADAS (advanced driver-assistance system).

The communication network 180*a*, the communication network 180*b*, the communication network 180*c*, the communication network 180*e*, the communication network 180*f*, the communication network 180*g*, the communication network 180*h*, the communication network 180*j*, and the communication network 180*k*, the communication network 180*m* are each an in-vehicle communication network including at least a CAN (Controller Area Network) communication network. The communication network 180*d* is an in-vehicle communication network line that is compliant with LIN (Local Interconnect Network) or the like. The communication network 180*i* and the communication network 180*l* are each an in-vehicle communication network including a communication network and a CAN communication network that is compliant with the Ethernet (registered trademark). It should be noted that, the communication networks 180*a* to 180*m* may be collectively referred to as the "communication network 180".

The TCU 201 and the IVI 299 has a function of receiving a GNSS signal and retrieving the current time. The core ECU 202 retrieves the current time by performing time synchronization with at least one of the TCU 201 and the IVI 299. The core ECU 202 causes the MID 298 to display the current time. In addition, the core ECU 202 performs timing of the current time in a sleep state after an ignition power source (IG power source) of the vehicle 20 is turned off, based on the current time retrieved by performing time synchronization with the TCU 201 or the IVI 299. It should be noted that, the ignition power source is one example of the main power source.

The core ECU 202 has a function of relaying communication of the ECUs 220*a* to 220*e*, the ECUs 240*a* to 240*i*, the ECU 210, the ECU 230, and the ECU 297. The ECUs 220*a* to 220*e*, the ECUs 240*a* to 240*i*, the ECU 210, the ECU 230, and the ECU 297 are slave ECUs that are capable of communicating through the in-vehicle communication network. The ECU 202 manages the activation of the ECUs 220*a* to 220*e* and the ECUs 240*a* to 240*f*, while the IG power source is in an off state. On the other hand, the ECU 240*g*, the ECU 240*h*, the ECU 240*i*, and the ECU 297 are slave ECUs that each has a function of managing the current time on its own while the IG power source is in an off state and self-activates when the current time becomes the predetermined activation time. The ECU 240*g*, the ECU 240*h*, the ECU 240*i*, and the ECU 297 are slave ECUs that are capable of activating without control by the ECU 202.

The core ECU 202 includes a time management unit 250, a management table 260, a diagnosis data storage unit 280, a communication unit 270, and a rewriting control unit 290.

The time management unit 250 manages the current time while the IG power source of the vehicle is in an off state. The management table 260 manages the activation time of each of the ECUs 220*a* to 220*e* and ECUs 240*a* to 240*f* that are in a sleep state while the IG power source is in an off state. When the current time becomes the activation time of each of the ECUs 220*a* to 220*e* and ECUs 240*a* to 240*f* while the IG power source is in an off state, the core ECU 202 sends an activation signal to each ECU through the in-vehicle communication network. In this manner, since each ECU of the ECUs 220*a* to 220*e* and the ECUs 240*a* to 240*f* can wait for the activation signal without managing the time for activation and in a sleep state, power consumption at the in-vehicle electronic system 22 can be reduced. It should be noted that, the IG power source is one example of the main power source of the vehicle 20.

The core ECU 202 sends the activation signal along with the current time. In this manner, the ECU 220 and the ECU 240 can receive the current time at the time of activation. In this manner, since the ECU 220 and the ECU 240 do not need to include a microcomputer having a timer function, the cost can be reduced. It should be noted that, the ECU 220 and the ECU 240 may retrieve diagnosis data when activated in response to the activation signal. At this time, the ECU 220 and the ECU 240 may identify the retrieval time of the diagnosis data based on the current time received along with the activation signal. The ECU 220 and the ECU 240 may send the identified retrieval time in association with the diagnosis data to the ECU 202.

When the IG power source is turned to an off state, the core ECU 202 receives the activation time of each ECU from each of the ECUs 220*a* to 220*e* and the ECUs 240*a* to 240*f*, and updates the activation time managed by the management table 260 based on the received activation time. In this manner, the activation time can be updated for each off cycle of the IG power source. Therefore, since the ECUs 220*a* to 220*e* and the ECUs 240*a* to 240*f* do not need to be unnecessarily waken-up, the power consumption can be reduced.

The rewriting control unit 290 control rewriting of programs of the ECUs 220*a* to 220*e* and the ECUs 240*a* to 240*f* using wired communication or wireless communication. Rewriting of a program performed using wireless communication may be called OTA (Over The Air). In a case where a rewriting of a program for at least one ECU among the ECUs 220*a* to 220*e* and the ECUs 240*a* to 240*f* has been performed, the core ECU 202 receives, from the ECU for which rewriting of the program has been performed, the activation time of the ECU for which rewriting of the program has been performed, and based on the received activation time, updates the activation time managed by the management table 260.

For example, in a case where the rewriting control unit 290 performs rewriting of the program for the ECU 220*a*, the program for the ECU 202*a* received by wireless communication through the TCU 201 is transferred to the ECU 220*a*. At this time, the rewriting control unit 290 causes the ECU 220*a* to operate in a program rewriting mode, thereby writing a program for the ECU 202*a* to the ECU 220*a*. The rewriting control unit 290 activates the program written to the ECU 220*a* such that it is read at the time of activation of the ECU 220*a*, and reactivates the ECU 220*a*. The program written to the ECU 220*a* includes activation time information indicating the activation time of the ECU 220*a* while the IG power source is turned off. When the ECU 220*a* is reactivated after activation, the ECU 220*a* sends, to the ECU 202, the activation time information included in the program written to the ECU 220a. In this manner, in a case where the activation time while the IG is turned off is changed or the activation time while the IG is off is added due to rewriting of the program for the ECU, the ECU can be activated at the correct activation time.

The communication unit 270 communicates with an external diagnosis apparatus for retrieving diagnosis data of the vehicle 20. When activated in response to reception of the activation signal, each of the ECUs 220a to 220e and the ECUs 240a to 240f sends the diagnosis information of the in-vehicle device retrieved by each ECU to the core ECU 202. The core ECU 202 stores the diagnosis information received from each of the ECUs 220a to 220e and the ECUs 240a to 240f In this manner, the responsiveness of diagnosis information for the external diagnosis apparatus can be improved.

As described above, the ECU 240g, the ECU 240h, the ECU 240i, and the ECU 297 each have a function of managing the current time while the IG power source is in an off state, and activates when the current time becomes a predetermine activation time. The ECUs 220a to 220e and the ECUs 240a to 240f of which the activation time is managed by the management table 260 do not have the function of managing the current time while the IG power source is in an off state. That is, the management table 260 does not include the activation time information for the ECU 240g, the ECU 240h, the ECU 240i, and the ECU 297. In this manner, the management table 260 may only manage the activation time information of ECUs that do not have the function of managing the current time while the IG power source is in an off state. Therefore, the amount of information to be managed by the management table 260 can be reduced, and the capacity of memories that need to be operated while in a sleep mode can be reduced.

It should be noted that, the ECUs 240a to 240c that are connected to the in-vehicle communication network 180f may be activated five hours after the IG power source is turned off while the IG power source is in an off state. For example, the ECUs 240a to 240c that are connected to the in-vehicle communication network 180g may be activated every three hours after the IG power source is turned off. The management table 260 manages information for identifying the communication network 180f in association with the identification information of the ECUs 240a to 240c, and further manages information for identifying the communication network 180g in association with the identification information of the ECUs 240d to 240f The core ECU 202 sends, to the communication network 180f, an activation signal for activating the ECU connected to the communication network 180f five hours after the IG power source is turned off, and sends, to the communication network 180g, an activation signal for activating the ECU connected to the in-vehicle communication network 180g every three hours after the IG power source is turned off.

In this manner, the plurality of first ECUs to be activated at a first activation time while the IG power source is in an off state, among the ECUs 220a to 220e and the ECUs 240a to 240f, are connected to the first in-vehicle communication network, and the plurality of second slave ECUs to be activated at a second activation time that is different from the first activation time while the IG power source is in an off state, among the ECUs 220a to 220e and the ECUs 240a to 240f, are connected to the second in-vehicle communication network. The management table 260 then manages information for identifying the first in-vehicle communication network in association with the identification information of the plurality of first slave ECUs, and further manages information for identifying the second in-vehicle communication network in association with the identification information of the plurality of second slave ECUs. The core ECU 202 sends, to the first in-vehicle communication network, an activation signal for activating the slave ECUs connected to the first in-vehicle communication network at a first activation time, and sends, to the second in-vehicle communication network, an activation signal for activating the slave ECUs connected to the second in-vehicle communication network at a second activation time. In this manner, by connecting the plurality of ECUs to be activated at a substantially same time to one communication network 180 in an aggregated manner as much as possible, adopting a configuration in which an activation signal for activating all of the ECUs connected to that communication network is sent to the communication network 180 becomes easier. Therefore, the ECUs connected to that communication network 180 do not need to have incorporated thereto a transceiver having a function of detecting an activation signal for activating the ECUs individually. In this manner, the number of transceivers compatible with wakeup can be reduced. Therefore, the cost can be reduced.

The management table 260 manages activation time range information indicating the time range that is permitted as the activation time of each of the ECUs 220a to 220e and the ECUs 240a to 240f. The core ECU 202 is connected to the same in-vehicle communication network, among the ECUs 220a to 220e and the ECUs 240a to 240f, based on the activation time range information managed by the management table 260, selects two or more slave ECUs having time ranges permitted as the activation time overlapped, and sends, to the in-vehicle communication network to which the selected two or more slave ECUs are connected, an activation signal at a time in a time period during which the permitted time ranges are overlapped.

FIG. 2 illustrates one example of a data structure of management information managed by a management table 260. The management information associates an ECU-ID, the individual activation recognition function, a communication network ID, and the plurality of activation times including activation time 1 and activation time 2.

The "ECUID" is identification information for the ECU to be activated by the ECU 202 while the IG is turned off, among the ECUs of the vehicle 20. The ECUIDs "1" to "5" in FIG. 2 indicate the ECUs 220a to 220e, in order. The ECUID "6" to "8" indicate the ECUs 240a to 240c. The ECUID "9" to "11" indicate the ECUs 240d to 240f.

An "individual activation recognition function" indicates where the ECU has a function of recognizing the activation signal for individually activating the ECU. The individual activation recognition function "1" indicates that the ECU has a function of recognizing the activation signal for individually activating the ECU, and the individual activation recognition function "0" indicates that the ECU does not have a function of recognizing the activation signal for individually activating the ECU. For example, the ECUs 220a to 220e have the function of recognizing the activation signal for individually activating the ECUs. To be specific, the ECU 220a has the function of detecting an activation signal designating the ECU 220a, from the signals passing through the communication network 180 while in a sleep state, and upon detection of the activation signal designating the ECU 220a, activates from a sleep state.

On the other hand, the ECUs 240a to 240d do not have the function of recognizing the activation signal for individually activating the ECUs. For example, the ECUs 240a to 240d have the function of activating from a sleep state upon detecting of the activation signal for the entire communication network from the signal passing through the communication network 180 while in a sleep state. However, any of the ECUs 240a to 240d do not have the function of detecting, while in a sleep state, the activation signal designating its own ECU.

The "communication network ID" is information for identifying the communication network 180 to which the ECU is connected. The communication network ID "1" to "5" in FIG. 2 indicates, in order, the communication network 180b, the communication network 180c, the communication network 180d, the communication network 180f, and the communication network 180g.

Each of the "activation time 1" and the "activation time 2" includes the activation time and the permitted time as data items. The "activation time" is information indicating the time of activation. In the present embodiment, the "activation time" indicates the period from the time the IG power source is turned off to the time the ECU is activated. The "permitted time" indicates the time range that is permitted for activating the ECU based on the activation time. The "activation time" and the "permitted range" are information indicating the time range for activating the ECU.

As one example, the activation time "5 h" and permitted time "±1 h" associated with the ECUID "1" indicate that, in order to perform leak check of the fuel injection device, the ECU 220a should be activated within a time range of four hours to six hours after the IG power source has been turned off, for example.

In addition, "every 5 min" and permitted time "±0 min" for the "activation time 1" of the ECUID "2" indicate that, in order to regularly measure the temperature of a high-voltage battery, the ECU 220b is activated at a five-minute interval after the IG power source has been turned off. "6 d" and the permitted time "±1 d" for the "activation time 2" of the ECUID "2" and the "activation time 1" of the ECUID "3" indicates that, in order to perform supplementary charging of the low-voltage battery by using the high-voltage battery, the ECU 220b and the ECU 220c are activated at a five-days to seven-days interval after the IG power source has been turned off. In addition, the activation time "2:00" of the ECUID "4" indicates that, in order to start the charging of the high-voltage battery at "2 AM" set by the user, the ECU 220d is activated when it is 2 AM after the IG power source has been turned off.

FIG. 3 illustrates a data structure of ECU activation information generated by the ECU 202. The ECU activation information associates the ECUID, the NWID, and the activation time with each other. The ECU 202 determines the activation time of each ECU by referring to the IG management table 260 when the IG is turned off.

The "ECUID" indicates identification information of the ECU. Any one or more value of the "ECUID" in the management table 260 is stored in the "ECUID". The "NWID" indicates identification information of the communication network 180 through which the activation signal for the entire communication network should be sent. The "activation time" is the activation time of the ECU. To be specific, the "activation time" indicates the period from the time the IG power source is turned off to the time the ECU is activated.

For example, according to the ECU activation information in FIG. 3, it is indicated that the ECU 202 activate an ECU identified by the ECUID "1" and "5" at an activation time that is "+5 h" after the IG has been turned off. That is, it is indicated that the ECU 202 activates the ECU 220a identified with the ECUID "1" and the ECU 220e identified with the ECUID "5" five hours after the IG has been turned off.

Here, according to the management information in FIG. 2, ECU 220a is permitted to be activated within a time range of four hours to six hours, and the ECU 220e is permitted to be activated within a time range of five hours to seven hours. The time range permitted for activating the ECU 220a and the time range permitted for activating the ECU 220e are overlapped in a time range of "five hours to six hours" after the IG has been turned off. Therefore, the ECU 202 determines, as the activation time of the ECU 220a and the ECU 220e, the time within a time range of "five hours to six hours later" in which the permitted time range for activating is overlapped. In order to activate the ECU 220a, activating the ECU 210 is required. In addition, in order to activate the ECU 220e, activating the ECU 210 is required. Therefore, by setting the activation time for the ECU 220a and the ECU 220e to be the same time, the ECU 210 only needs to be activated once to activate the ECU 220a and the ECU 220e. Therefore, as compared to a case where the ECU 210a and the ECU 210e are activated at a separate time, the power consumption require to activated the ECU 210a and the ECU 220e can be reduced.

As described above, the ECUs 220a to 220e each has a function of recognizing an individual activation signal. Therefore, when activating the ECUs 220a to 220e, an activation signal for the entire communication network is not sent. Therefore, for the ECUs 220a to 220e, an invalid value is set for the "NWID" in the ECU activation information.

In addition, as indicated in the ECU activation information in FIG. 3, the ECU 202 determines to activate the ECU 220b identified by the ECUID "2" every five minutes after the IG power source is turned off, based on the management information. In addition, the ECU 202 determines to activate the ECU 220b identified with the ECUID "2" and the ECU 220c identified with the ECUID "3" every six days after the IG power source is turned off, according to the management information. In addition, the ECU 202 determines to activate the ECU 220d identified with the ECUID "4" at 2 AM after the IG power source is turned off, according to the management information.

Next, the activation time for an ECU not having a function of recognizing an individual activation signal, such as the ECUs 240a to 240d will be discussed. As shown in FIG. 3, the ECU 202 determines to send an activation signal for the entire communication network to the communication network 180f identified with the NWID "4". According to the management information in FIG. 2, the time ranges for permitting activation of the ECU 240a, the ECU 240b, and the ECU 240c are respectively "4 to 6 hours", "5 to 7 hours", and "3 to 5 hours" after the IG power source is turned off. Therefore, the ECU 202 determines, as the activation time for the ECU 240a, the ECU 240b, and the ECU 240c, a time that is five hours after the IG power source is turned off, which is a time where these time ranges overlap. In this manner, the ECU 202 can activate the ECU 240a, the ECU 240b, and the ECU 240c at the same time. Therefore, as compared to a case where the ECU 240a, the ECU 240b, and the ECU 240c are activated at a separate time, the power consumption required for activation can be reduced.

In addition, as shown in FIG. 3, the ECU 202 determines to send an activation signal for the entire communication network to the communication network 180g identified with the NWID "5". According to the management information in FIG. 2, the time ranges for permitting activation of the ECU 240d, the ECU 240e, and the ECU 240f are respectively "1 to 3 hours", "2 to 4 hours", and "5 to 7 hours" after the IG power source is turned off. Therefore, the ECU 202 determines, as the activation time for the ECU 240a, the ECU 240b, and the ECU 240c, a time that is three hours after the IG power source is turned off, and determines to send an activation signal for the entire communication network to the communication network 180g three hours after the IG power source is turned off. In this manner, the ECU 240d and the ECU 240e can be activated at the same time at timing within a range permitted by the management information in FIG. 2. It should be noted that, the ECU 240f is activated at more timing than permitted by the management information in FIG. 2. However, by activating the ECU 240d and the ECU 240e at the same time, the number of activation of the ECU 240f can be reduced as compared to a case where the ECU 240d and the ECU 240e are activated at a separate time. In this manner, as compared to a case where the ECU 240d, the ECU 240e, and the ECU 240f are activated at a separate time, the power consumption require for activation of each ECU can be reduced.

Figure 4:
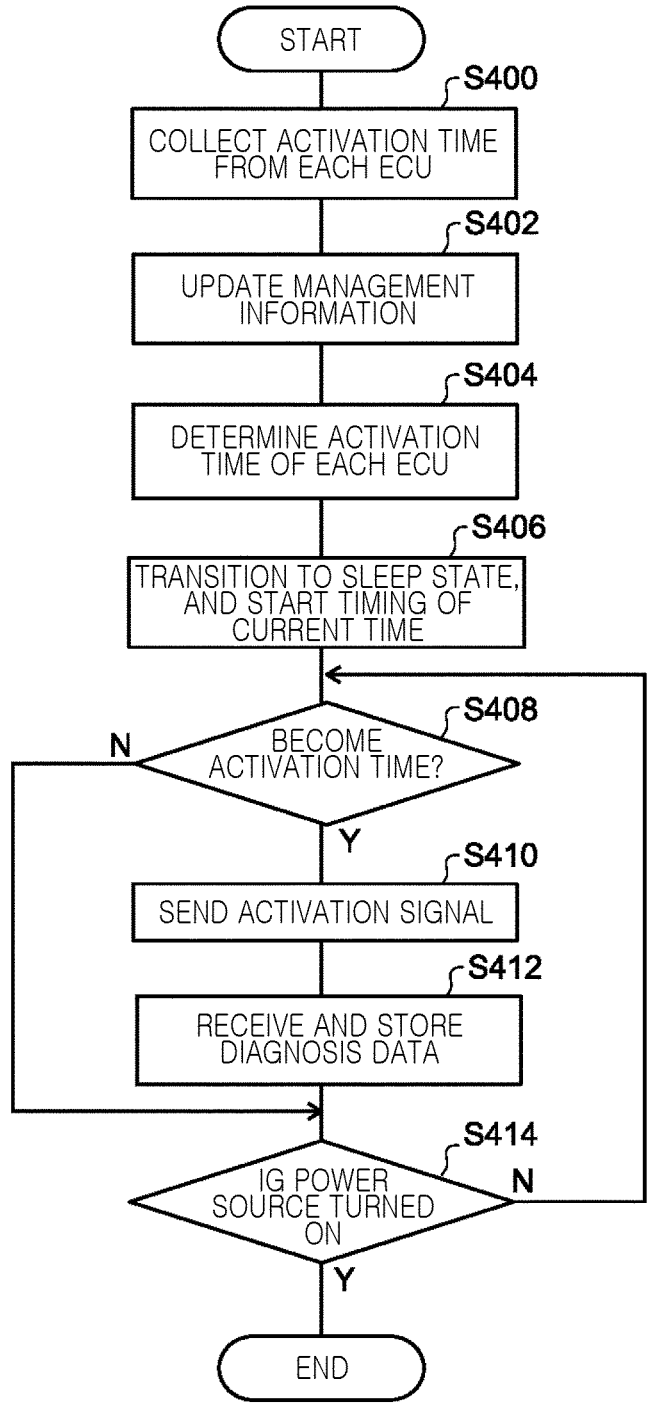
FIG. 4 illustrates an execution procedure of processing performed by the ECU 202 in a case where an IG power source is turned off.

FIG. 4 illustrates an execution procedure of processing performed by the ECU 202 in a case where an IG power source is turned off. The processing of the flowchart in FIG. 4 starts when the IG power source of the vehicle 20 is turned off.

At S400, the ECU 202 collects the activation time information indicating the activation time from the ECUs 220a to 220e and the ECUs 240a to 240f to be activated by the ECU 202 while in a sleep state. The ECUs 220a to 220e and the ECUs 240a to 240f each store the activation time information indicating the activation time and the permitted time defined by the program for controlling each ECU. When the IG power source is turned off, the ECUs 220a to 220e and the ECUs 240a to 240f sends the activation time information defined by the program for controlling the ECU to the ECU 202 through the communication network 180. It should be noted that, when the IG power source is turned off, the ECU 202 may collect the activation time information by sending a signal for requesting transmission of the activation time information to the ECUs 220a to 220e and the ECUs 240a to 240f. It should be noted that, the ECU connected not only to the power source system from which power is supplied while in a sleep state but also to the IG power source, among the ECUs 220a to 220e and the ECUs 240a to 240f may send the activation time information to the ECU 202 when the power supply from the IG power source is stopped.

At S402, the management information is updated based on the activation time information collected from each ECU. To be specific, the ECU 202 updates the information on a plurality of data item of the activation time including the "activation time 1" and the "activation time 2" of in the management information, based on the activation time information collected from each ECU.

At S404, the ECU 202 determines the activation time of each ECU including the ECUs 220a to 220e and the ECUs 240a to 240f. To be specific, based on the management information updated at S402, the ECU 202 determines the ECU activation information including the activation time of each ECU, as discuss in relation with FIG. 2, FIG. 3 and the like. To be more specific, the ECU 202 determines the activation time to be within a time range in which the time ranges during which activation of a plurality of ECUs is permitted is overlapped, based on the activation time and the permitted time of each ECU.

At S406, the ECU 202 transitions to a sleep state. When the ECU 202 turns into a sleep state, the power source state of the ECU 202 becomes a sleep state, and the time management unit 250 starts the timing of the current time. It should be noted that, the ECU 202 performs time synchronization with the TCU 201 or the IVI 299 while the IG power source is turned on. The time management unit 250 determines, while in a sleep state, the time determined by performing time synchronization while the IG power source is turned on, and the current time based on a clock signal in the ECU 202.

At S408, the time management unit 250 decides whether the current time corresponds to any of the activation time of each ECU determined at S404. When the current time corresponds to any of the activation time of each ECU, the processing transitions to S410, and when the current time does not correspond to any on the activation time of each ECU, the processing transitions to S414. It should be noted that, at S408, the time management unit 250 may take into consideration the delay time required for transmission of the activation signal to decide whether the current time corresponds to a time that is earlier by a predetermined delay time than the activation time of each ECU determined at S404.

When it is decided that the current time corresponds to any of the activation time of each ECU in the decision at S408, an activation signal is sent at S410. Then, at S412, the ECU 202 receives diagnosis data retrieved by the activated ECU and stores the received diagnosis data in the diagnosis data storage unit 280, and the processing transitions to S414. It should be noted that, at S412, each ECU may identify the retrieval time of the diagnosis data based on the current time sent at S410, and send the retrieval time of the diagnosis data along with the diagnosis data to the ECU 202. The ECU 202 may store the diagnosis data received from each ECU in the diagnosis data storage unit 280 in association with the retrieval prescription. In addition, when an external diagnosis apparatus is connected to the diagnosis port 34, the ECU 202 may send the diagnosis data stored in the diagnosis data storage unit 280 to the external diagnosis apparatus without receiving diagnosis data from each ECU.

At S414, it is decided whether the IG power source is turned on. When the IG power source is not turned on, the processing transitions to S408. When the IG power source is turned on, the processing of the present flowchart is ended, and the ECU 202 start the processing of when the IG power source is turned on.

As discussed above, according to the in-vehicle electronic system 22, the ECU 202 performs timing while the IG power source is turned off, and activates each of the plurality of ECUs at the activation time defined in the management table. Therefore, the plurality of ECUs to be activated by the ECU 202 do not need to have timing function incorporated thereto. Therefore, the power consumption of the in-vehicle electronic system 22 while in a sleep state can be reduced.

The vehicle 20 is a vehicle as one example of a transportation equipment. The vehicle may be an automobile such as an automobile having an internal combustion engine, an electric vehicle and a fuel cell vehicle (FCV). The automobile includes a bus, a truck, a two-wheeled vehicle and the like. The vehicle may be a saddle-type vehicle or the like, and may be a motorcycle. The transportation equipment includes equipment such as an airplane including an unmanned aerial vehicle and a ship, in addition to the vehicle. The transportation equipment may any equipment configured to transport people or goods. The transportation equipment is one example of the mobile object. The mobile object is not limited to the transportation equipment and may be any movable equipment.

Figure 5:
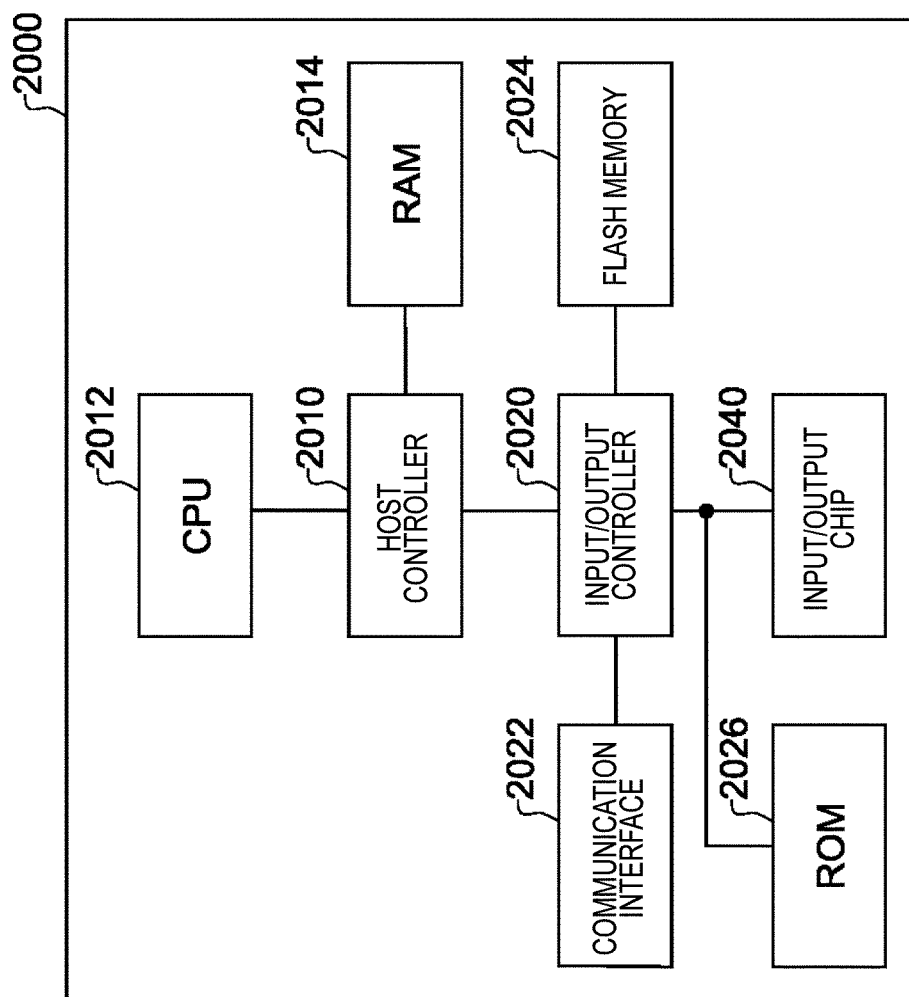
FIG. 5 illustrates an example of a computer 2000.

FIG. 5 illustrates an example of a computer 2000 in which a plurality of embodiments of the present invention may be entirely or partially embodied. A program that is installed in the computer 2000 can cause the computer 2000 to function as a system such as the in-vehicle electronic system of the embodiment or each unit of the system or as an apparatus such as the ECU 202 or each unit of the apparatus, to execute operations associated with the system or each unit of the system or the apparatus or each unit of the apparatus, and/or to execute the process of the embodiment or steps thereof. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 is configured to operate according to programs stored in the ROM 2026 and the RAM 2014, thereby controlling each unit.

The communication interface 2022 is configured to communicate with other electronic devices via a network. The flash memory 2024 is configured to store a program and data that are used by the CPU 2012 in the computer 2000. The ROM 2026 is configured to store a boot program or the like that is executed by the computer 2000 at the time of activation, and/or a program depending on hardware of the computer 2000. The input/output chip 2040 may also be configured to connect various input and output units such as a keyboard, a mouse, and a monitor, to the input/output controller 2020 via input/output ports such as a serial port, a parallel port, a keyboard port, a mouse port, a monitor port, a universal serial bus (USB) port and a high-definition multimedia interface (HDMI (registered trademark)) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and is executed by the CPU 2012. Information processing described in these programs is read into the computer 2000, resulting in cooperation between the programs and the various types of hardware resources described above. An apparatus or a method may be constituted by realizing operation or processing of information according to a use of the computer 2000.

For example, when communication is performed between the computer 2000 and an external device, the CPU 2012 may be configured to execute a communication program loaded onto the RAM 2014 to instruct communication processing to the communication interface 2022, based on processing described in the communication program. The communication interface 2022 is configured, under control of the CPU 2012, to read transmission data stored on a transmission buffer processing region provided in a recording medium such as the RAM 2014 and the flash memory 2024, to transmit the read transmission data to the network, and to write reception data received from the network to a reception buffer processing region or the like provided on the recording medium.

In addition, the CPU 2012 may be configured to cause all or a necessary portion of a file or a database, which has been stored in a recording medium such as the flash memory 2024, to be read into the RAM 2014, thereby executing various types of processing on the data on the RAM 2014. Next, the CPU 2012 is configured to write the processed data back to the recording medium.

Various types of information, such as various types of programs, data, tables, and databases, may be stored in the recording medium and may be subjected to information processing. The CPU 2012 may be configured to execute, on the data read from the RAM 2014, various types of processing including various types of operations, processing of information, conditional judgment, conditional branching, unconditional branching, search and replacement of information, and the like described in the present specification and specified by instruction sequences of the programs, and to write a result back to the RAM 2014. The CPU 2012 may also be configured to search for information in a file, a database, etc., in the recording medium. For example, when a plurality of entries, each having an attribute value of a first attribute associated with an attribute value of a second attribute, is stored in the recording medium, the CPU 2012 may be configured to search for an entry having a designated attribute value of the first attribute that matches a condition from the plurality of entries, and to read the attribute value of the second attribute stored in the entry, thereby obtaining the attribute value of the second attribute associated with the first attribute that satisfies a predetermined condition.

The programs or software modules described above may be stored in a computer-readable storage medium on or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program that is installed in the computer 2000 and causes the computer 2000 to function as the ECU 202 may work on the CPU 2012 and the like to cause the computer 2000 to function as each unit of the ECU 202, respectively. Information processing described in these programs are read into the computer 2000 to cause the computer to function as each unit of the ECU 202, which is a specific means realized by cooperation of software and the various types of hardware resources described above. Then, with these specific means, by realizing computing or processing of information according to an intended use of the computer 2000 in the present embodiment, the specific first ECU 210 is constructed according to the intended use.

Various embodiments have been described with reference to the block diagrams and the like. In the block diagrams, each block may represent (1) a step of a process in which an operation is executed, or (2) each unit of an apparatus having a role in executing the operation. Certain steps and each unit may be implemented by dedicated circuitry, programmable circuitry supplied with computer-readable instructions stored on computer-readable storage media, and/or processors supplied with computer-readable instructions stored on computer-readable storage media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable storage media may include any tangible device that can store instructions to be executed by a suitable device, and as a result, the computer-readable storage medium having the instructions stored thereon constitutes at least a part of an article of manufacture including instructions which can be executed to provide means for performing operations specified in the processing procedures or block diagrams. Examples of the computer-readable storage media may include an electronic storage medium, a magnetic storage medium, an optical storage medium, an electromagnetic storage medium, a semiconductor storage medium, and the like. More specific examples of the computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as the "C" programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., and the computer-readable instructions may be executed to provide means for performing operations specified in the described processing procedures or block diagrams. Examples of processors include computer processors, processing units, microprocessors, digital signal processors, controllers, microcontrollers, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: vehicle,
22: in-vehicle electronic system,
34: diagnosis port,
180: communication network,
201: TCU,
202: ECU,
210, 220, 230, 240: ECU,
250: time management unit,
260: management table,
270: communication unit,
280: diagnosis data storage unit,
290: rewriting control unit,
297: ECU,
298: MID,
299: IVI,
2000: computer,
2010: host controller,
2012: CPU,
2014: RAM,
2020: input/output controller,
2022: communication interface,
2024: flash memory,
2026: ROM,
2040: input/output chip

What is claimed is:

1. An in-vehicle electronic system comprising:
a core ECU (Electronic Control Unit) mounted in a vehicle; and
a plurality of slave ECUs that is capable of communicating with the core ECU through an in-vehicle communication network,
wherein the core ECU is configured to:
manage a current time while a main power source of the vehicle is in an off state; and
manage an activation time of each of the plurality of slave ECUs in a sleep state with a management table while the main power source is in the off state;
wherein the core ECU is configured to send an activation signal to each slave ECU through the in-vehicle communication network when the current time becomes the activation time of each of the plurality of slave ECUs while the main power source is in the off state, and
wherein the core ECU is configured to receive the activation time of each slave ECU from each of the plurality of slave ECUs in a case where the main power source is turned to the off state, and based on the received activation time, update the activation time managed by the management table.

2. The in-vehicle electronic system according to claim 1, wherein
the core ECU sends the activation signal along with the current time.

3. The in-vehicle electronic system according to claim 1, wherein
a program of the plurality of slave ECUs can be rewritten through wired communication or wireless communication, and
in a case where a program has been rewritten for at least one slave ECU among the plurality of slave ECUs, the core ECU is configured to receive, from a slave ECU for which the program has been rewritten, an activation time of a slave ECU for which the program has been rewritten, and based on the received activation time, updates the activation time managed by the management table.

4. The in-vehicle electronic system according to claim 1, wherein
the core ECU is configured to communicate with an external diagnosis apparatus that retrieves diagnosis data of the vehicle,
upon activation in response to reception of the activation signal, each of the plurality of slave ECUs is configured to send, to the core ECU, diagnosis information of an in-vehicle device retrieved by each slave ECU, and
the core ECU is configured to store the diagnosis information received from each of the plurality of slave ECUs.

5. The in-vehicle electronic system according to claim 1, further comprising:
one or more slave ECUs having a function of managing a current time while the main power source is in the off state, and configured to be activated when the current time becomes a predetermined activation time, wherein
the plurality of slave ECUs for which the activation time is managed by the management table is each an ECU that does not have a function of managing a current time while the main power source is in the off state.

6. The in-vehicle electronic system according to claim 1, wherein
a plurality of first slave ECUs, among the plurality of slave ECUs, to be activated at a first activation time while the main power source is in the off state, are connected to a first in-vehicle communication network,
a plurality of second slave ECUs, among the plurality of slave ECUs, to be activated at a second activation time that is different from the first activation time while the main power source is in the off state, are connected to a second in-vehicle communication network,
the management table is further configured to manage information for identifying the first in-vehicle communication network in association with identification information of the plurality of first slave ECUs, and to manage information for identifying the second in-vehicle communication network in association with identification information of the plurality of second slave ECUs, wherein
the core ECU is configured to:
send, to the first in-vehicle communication network, an activation signal for activating a slave ECU connected to the first in-vehicle communication network at the first activation time, and
send, to the second in-vehicle communication network, an activation signal for activating a slave ECU connected to the second in-vehicle communication network at the second activation time.

7. The in-vehicle electronic system according to claim 1, wherein
the management table is configured to manage activation time range information indicating a time range that is permitted as the activation time for each of the plurality of slave ECUs,
the core ECU is configured to select, among the plurality of slave ECUs, two or more slave ECUs that are connected to a same in-vehicle communication network and have a time range that is permitted as the activation time overlapping with each other, based on the activation time range information managed by the management table, and to send the activation signal to the in-vehicle communication network to which the selected two or more slave ECUs are connected at a time within a time period during which time ranges permitted as the activation time are overlapped.

8. The in-vehicle electronic system according to claim 2, wherein
a program of the plurality of slave ECUs can be rewritten through wired communication or wireless communication, and
in a case where a program has been rewritten for at least one slave ECU among the plurality of slave ECUs, the core ECU is configured to receive, from a slave ECU for which the program has been rewritten, the activation time of a slave ECU for which the program has been rewritten, and based on the received activation time, updates the activation time managed by the management table.

9. The in-vehicle electronic system according to claim 2, wherein
the core ECU is configured to communicate with an external diagnosis apparatus that retrieves diagnosis data of the vehicle,
upon activation in response to reception of the activation signal, each of the plurality of slave ECUs is configured to send, to the core ECU, diagnosis information of an in-vehicle device retrieved by each slave ECU, and
the core ECU is configured to store the diagnosis information received from each of the plurality of slave ECUs.

10. The in-vehicle electronic system according to claim 2, further comprising:
one or more slave ECUs having a function of managing a current time while the main power source is in the off state, and configured to be activated when the current time becomes a predetermined activation time, wherein
the plurality of slave ECUs for which the activation time is managed by the management table is each an ECU that does not have a function of managing a current time while the main power source is in the off state.

11. The in-vehicle electronic system according to claim 2, wherein
a plurality of first slave ECUs, among the plurality of slave ECUs, to be activated at a first activation time while the main power source is in the off state, are connected to a first in-vehicle communication network,
a plurality of second slave ECUs, among the plurality of slave ECUs, to be activated at a second activation time that is different from the first activation time while the main power source is in the off state, are connected to a second in-vehicle communication network,
the management table is further configured to manage information for identifying the first in-vehicle communication network in association with identification information of the plurality of first slave ECUs, and to manage information for identifying the second in-vehicle communication network in association with identification information of the plurality of second slave ECUs, wherein
the core ECU is configured to:
send, to the first in-vehicle communication network, an activation signal for activating a slave ECU connected to the first in-vehicle communication network at the first activation time, and
send, to the second in-vehicle communication network, an activation signal for activating a slave ECU connected to the second in-vehicle communication network at the second activation time.

12. The in-vehicle electronic system according to claim 2, wherein the management table is configured to manage activation time range information indicating a time range that is permitted as the activation time for each of the plurality of slave ECUs, the core ECU is configured to select, among the plurality of slave ECUs, two or more slave ECUs that are connected to a same in-vehicle communication network and have a time range that is permitted as the activation time overlapping with each other, based on the activation time range information managed by the management table, and to send the activation signal to the in-vehicle communication network to which the selected two or more slave ECUs are connected at a time within a time period during which time ranges permitted as the activation time are overlapped.

13. A vehicle comprising the in-vehicle electronic system according to claim 1.

14. A control method performed by a core ECU mounted in a vehicle and that is capable of communicating with a plurality of slave ECUs through an in-vehicle communication network, the control method comprising:

managing a current time while a main power source of the vehicle is in an off state;

sending an activation signal to each slave ECU through the in-vehicle communication network, when the current time becomes an activation time of each of the plurality of slave ECUs while the main power source is in the off state, based on a management table for managing the activation time of each of the plurality of slave ECUs in a sleep state while the main power source is in the off state; and receiving the activation time of each slave ECU from each of the plurality of slave ECUs in a case where the main power source is turned to the off state, and based on the received activation time, updating the activation time managed by the management table.

15. A non-transitory computer-readable storage medium having stored thereon a program, wherein the program causes a computer, which functions as a core ECU that is mounted in a vehicle and that is capable of communicating with a plurality of slave ECUs through an in-vehicle communication network, to perform operations comprising:

managing a current time while a main power source of the vehicle is in an off state;

sending an activation signal to each slave ECU through the in-vehicle communication network, when the current time becomes an activation time of each of the plurality of slave ECUs while the main power source is in the off state, based on a management table for managing the activation time of each of the plurality of slave ECUs in a sleep state while the main power source is in the off state; and receiving the activation time of each slave ECU from each of the plurality of slave ECUs in a case where the main power source is turned to the off state, and based on the received activation time, updating the activation time managed by the management table.

* * * * *